United States Patent [19]

Ohyauchi et al.

[11] Patent Number: 4,693,945
[45] Date of Patent: Sep. 15, 1987

[54] POWER GENERATOR CONTAINING FUEL CELL

[75] Inventors: Hideo Ohyauchi; Yoshiaki Amano, both of Ibaraki; Eiji Yokoyama, Kashiwa, all of Japan

[73] Assignee: Hitachi, Ltd., Tokyo, Japan

[21] Appl. No.: 854,503

[22] Filed: Apr. 22, 1986

[30] Foreign Application Priority Data

Apr. 22, 1985 [JP] Japan .................................. 60-84487

[51] Int. Cl.⁴ ............................................. H01M 8/06
[52] U.S. Cl. ......................................... 429/21; 429/23
[58] Field of Search ...................... 429/21, 22, 23, 17, 429/19, 34, 64

[56] References Cited

U.S. PATENT DOCUMENTS

| | | | |
|---|---|---|---|
| 3,416,966 | 12/1968 | Oswin | 429/21 |
| 3,542,597 | 11/1970 | Smith et al. | 429/17 |
| 3,544,377 | 12/1970 | Justi et al. | 429/21 |
| 3,553,023 | 1/1971 | Doyle | 429/22 X |
| 3,956,013 | 5/1976 | Miyoshi et al. | 429/19 |
| 3,981,745 | 9/1976 | Stedman | 429/21 X |
| 4,098,959 | 7/1978 | Fanciullo | 429/23 X |
| 4,304,823 | 12/1981 | Lemelson | 429/17 X |
| 4,395,469 | 7/1983 | Fritts | 429/21 X |
| 4,436,793 | 3/1984 | Adlhart | 429/21 X |

Primary Examiner—Anthony Skapars
Attorney, Agent, or Firm—Antonelli, Terry & Wands

[57] ABSTRACT

A power generator containing a fuel cell (or cells) characterized by a fuel supply means designed to supply hydrogen gas and oxygen gas to the hydrogen and oxygen feed lines leading to the cell in response to a rapid rise of power load connected to the cell. This power generator suffers from no shortage of output power due to a delay of action and is excellent in responsiveness to sharp rise of load. In a preferred embodiment of this invention, the electrolyte is electrolyzed to produce hydrogen gas and oxygen gas by DC power generated by the fuel cell, and the produced gases are led to the hydrogen and oxygen feed lines leading to the fuel cell.

7 Claims, 6 Drawing Figures

(a)

(b)

POWER GENERATOR CONTAINING FUEL CELL

BACKGROUND OF THE INVENTION

The present invention relates to a power generator containing fuel cell(s), more particularly to such a power generator with improved responsiveness to rapid rise of load.

Power generators using fuel cells (hereinafter referred to as "fuel-cell power generators") are known as for instance disclosed in Japanese Patent Publication No. 56231/83 and Japanese Patent Laid-Open No. 163183/83. In the conventional power generators of this type, when there occurs a sharp change of power load connected to the fuel cell, for instance, a change from 25% load to 100% load, it is required to quickly increase the gas feed to the hydrogen electrode of the cell to cope with such change of load. For effecting such a quick increase of gas feed, it is necessary to rapidly enlarge the openings of valves such as main fuel feed regulating valve, air regulating valve and vapor regulating valve.

Generally, however, the valve control systems are subject to a certain time lag in their operation even if the valves involved are relatively small in size, and usually they suffer a delay of action for a time of from about 2 to about 10 seconds. The conventional fuel-cell power generators were unable to keep pace with the change of load during the period of such delay of action to incur a shortage of output power during this period. This is a serious problem especially with the on-site type fuel-cell power generators which are set and used independently of the general power supply because the change of load occurs very quickly and frequently in such on-site type power generators.

SUMMARY OF THE INVENTION

An object of the present invention is to provide a fuel-cell power generator with excellent responsiveness to sharp rise of load.

In order to accomplish this object, the invention provides a fuel-cell power generator comprising hydrogen and oxygen feed lines, a fuel cell which generates power as it receives hydrogen and oxygen from their respective feed lines, and a fuel supply means which supplies hydrogen gas to said hydrogen feed line and oxygen gas to said oxygen feed line, respectively, when a rapid rise of power load connected to said fuel cell occurs. The device of the present invention is designed to enable quick supply of fuel on the occurrence of temporary shortage of fuel resulting from a rapid rise of load to cope with any rapid change of load.

Other objects, features and advantages of the present invention will become apparent from a review of the following detailed description of the invention when taken in conjunction with the accompanying drawings.

DESCRIPTION OF THE PREFERRED EMBODIMENTS

Before describing the device of the present invention, the basic mechanism of a typical conventional fuel-cell power generator is illustrated with reference to FIG. 4.

Figure 4:
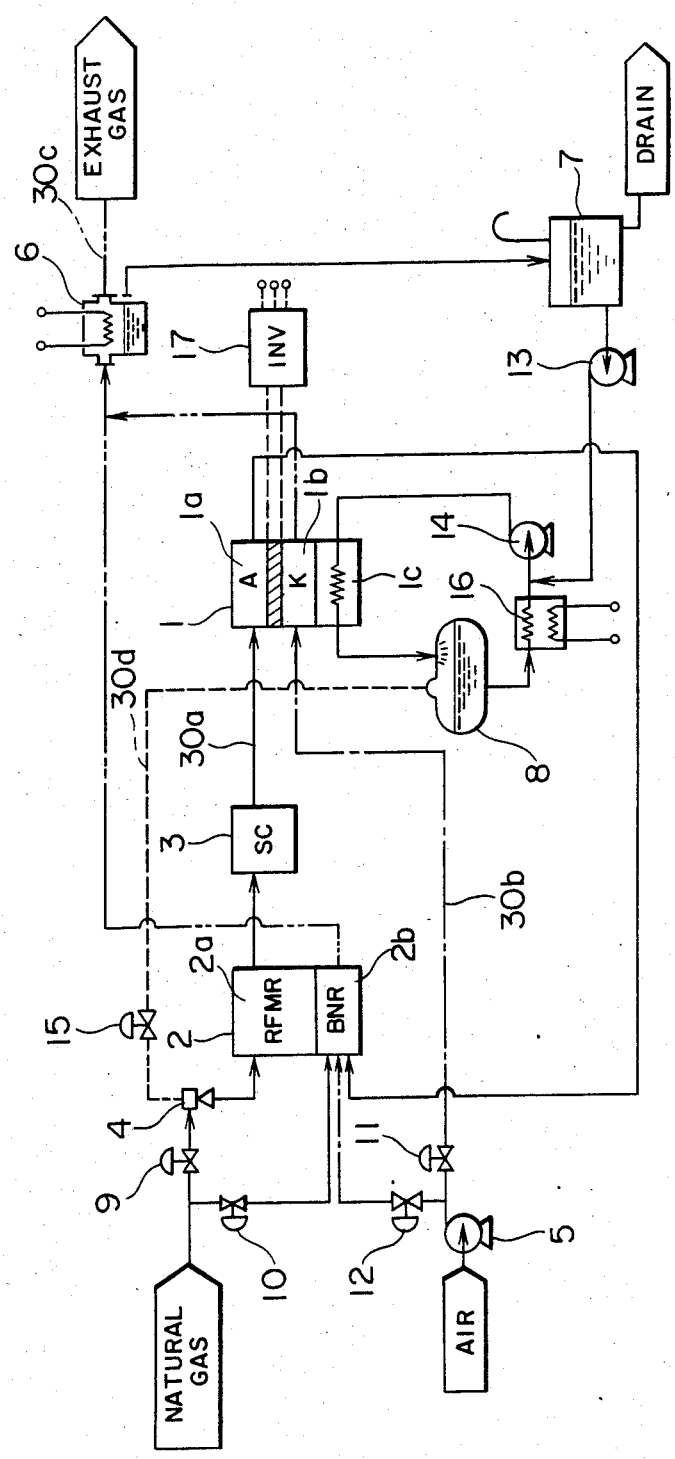
FIG. 4 is a system diagram of a conventional fuel-cell power generator.

In the drawing of FIG. 4, solid line arrow 30a indicates the natural gas and reaction gas (hydrogen gas) feed passage (hydrogen feed line), single-dotted chain line arrow 30b indicates the air (oxygen gas) feed passage (oxygen feed line), double-dotted chain line arrow 30c indicates the discharge gas passage, and broken line arrow 30d indicates the water vapor passage.

Numeral 1 refers to a fuel cell consisting of a hydrogen electrode 1a and an oxygen electrode 1b and provided with a cell cooler 1c. Numeral 2 designates a reformer by which fuel gas such as natural gas is reformed into hydrogen-rich gas by mixing air with said fuel gas. Reformer 2 consists of a reaction section 2a and a combustion section 2b. 3 denotes a shift converter for the reaction gas produced in said reformer 2. In this shift converter 3, carbon monoxide CO in the gas is reacted with water and converted into carbon dioxide $CO_2$ and hydrogen $H_2$.

4 is an ejector (or mixer) by which fuel gas such as natural gas is mixed with water vapor. 5 is a blower by which air (oxygen gas) is supplied to oxygen electrode 1b of cell 1. Part of air is also supplied into combustion section 2b of reformer 2. 6 refers to a heat exchanger for discharge gas, in which water contained in discharge air from oxygen electrode 1b of cell 1 and in discharge gas from combustion section 2b of reformer 2 is recovered while also recovering heat from said discharge air and discharge gas. Water recovered in said heat exchanger 6 is stored in tank 7. Water stored in said tank 7 is led into vapor generator 8 via cell cooler 1c and flashed therein, and the vapor produced in said vapor generator is led into ejector 4.

In this system, fuel gas such as natural gas is guided into ejector 4 through main fuel regulating valve 9 and mixed with water vapor by said ejector 4. The fuel gas mixed with water vapor is then passed into reaction section 2a of reformer 2 where said fuel gas is reformed into hydrogen-rich gas. Part of fuel gas is sent into combustion section 2b of reformer 2 via auxiliary fuel regulating valve 10.

As shown by solid line 30a, the hydrogen-rich gas is led into shift converter 3 where carbon monoxide in the gas is reacted with water and converted into carbon dioxide and hydrogen. Then, after removing extra water if any, the gas is guided to hydrogen electrode 1a of cell 1 where approximately 80% of hydrogen is consumed. The discharge gas from hydrogen electrode 1a containing the remaining 20% of hydrogen is returned to combustion section 2b of reformer 2 and utilized as a part of combustion heat necessary for the reforming reaction.

On the other hand, air is supplied to oxygen electrode 1b of cell 1 through main air regulating valve 11 as shown by single-dotted chain line 30b. Part of air is also supplied into combustion section 2b of reformer 2 via auxiliary air regulating valve 12. Discharge air from oxygen electrode 1b of cell 1 and discharge gas from combustion section 2b of reformer 2 are joined and led into heat exchanger 6 where the gas is cooled by circulating water or such until water vapor in said discharge air and discharge gas condenses to accomplish waste heat recovery and water recovery. Recovered water is led into water tank 7 and reused. That is, recovered water once stored in said tank 7 is led out as supplementary feed water by water feed pump 14 and joined with cooling water supplied to cell cooler 1c, and the joined water is pressurized and fed into cell cooler 1c by cooling water pump 14. Cooling water takes heat from cell 1 and then is flashed in vapor generator 8, whereby part of said cooling water is vaporized and the produced vapor is led into ejector 4 after regulated in flow rate by vapor regulating valve 15.

The superfluous heat generated in the cooling system of cell 1 is recovered in the form of hot water, etc., by heat exchanger 16.

DC power generated by cell 1 is converted into AC power by DC-AC converter 17.

Figure 5:
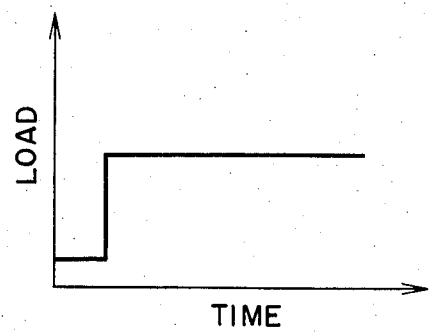
FIG. 5 is diagrams illustrating the characteristic pattern of power generation by the conventional device shown in FIG. 4, in which (a) is a characteristic diagram of load and (b) is a characteristic diagram of power generation.
Figure 5:
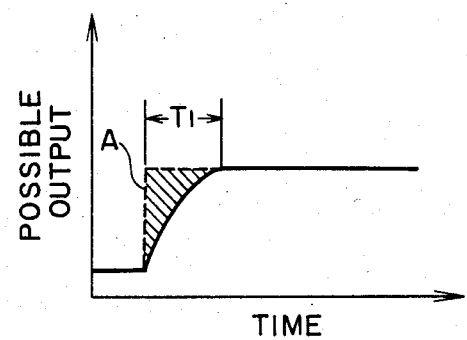

FIG. 5(a) is a diagram illustrating load-time characteristic in case the load has increased in the manner of a step function, and FIG. 5(b) is a diagram illustrating the pattern of generation of power from the fuel-cell power generator. As seen from this diagram, there is produced a shortage of output power by an amount corresponding to shaded area A due to time lag T1 of action.

Now, the present invention is described by way of embodiments thereof with particular reference to FIGS. 1-3 and 6.

Figure 1:
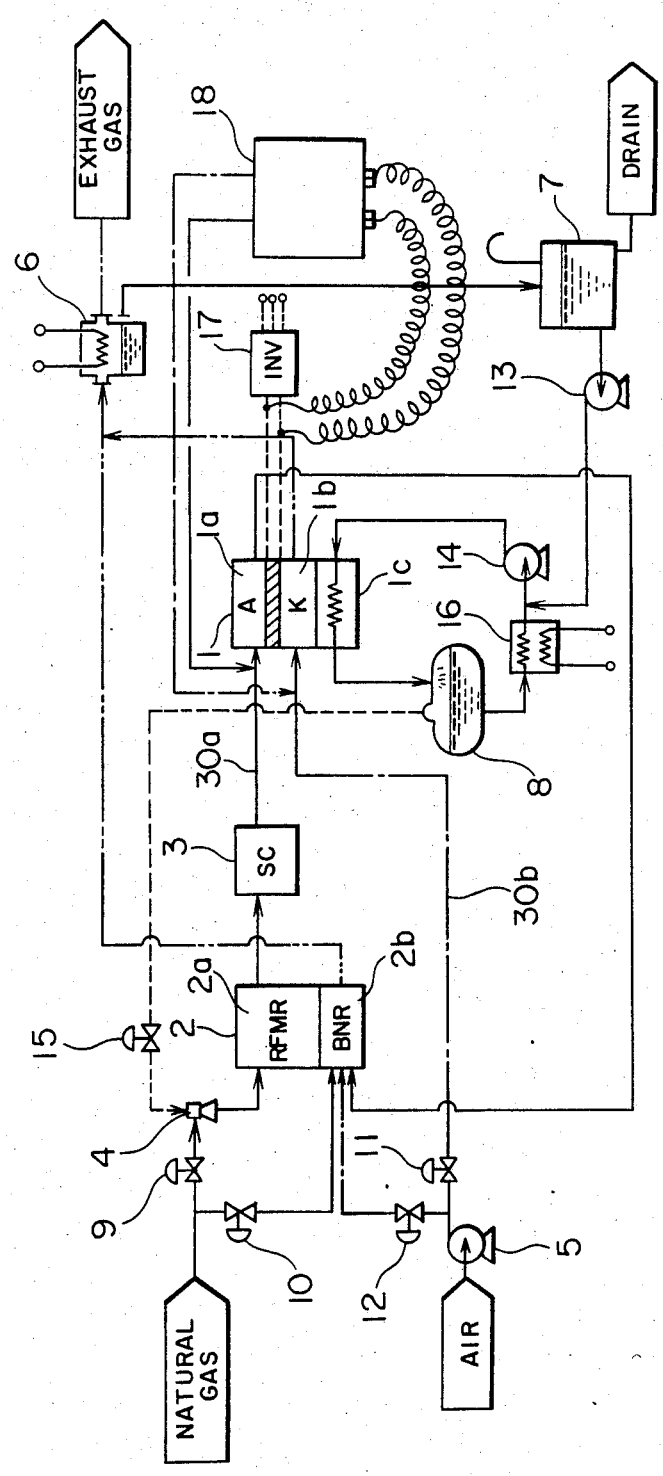
FIG. 1 is a system diagram illustrating a preferred example of fuel-cell power generator according to this invention.
Figure 2:
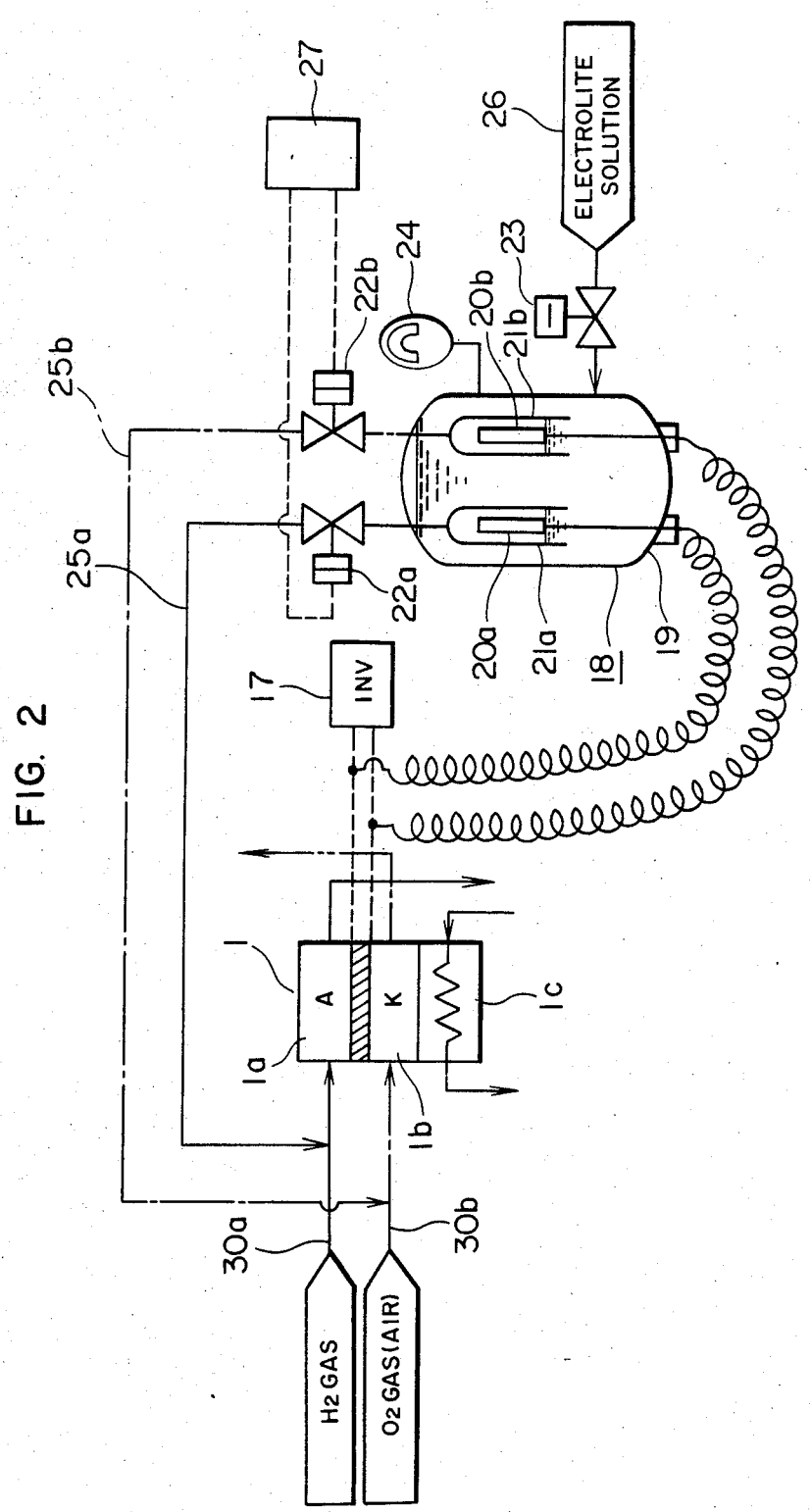
FIG. 2 is a system diagram illustrating in detail the fuel supply means and the neighboring elements in the power generator shown in FIG. 1.
Figure 3:
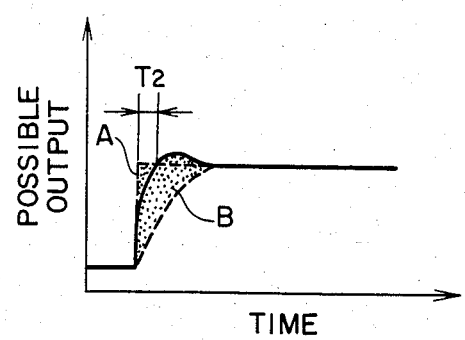
FIG. 3 is a diagram illustrating the characteristic pattern of power generation by the device of this invention.

FIG. 1 illustrates the fuel-cell power generator in an embodiment of this invention. FIG. 2 shows, in particular, the fuel supply mechanism in the device of FIG. 1. FIG. 3 illustrates the characteristic of power generation by the device shown in FIG. 1.

In these drawings, the parts identical with or corresponding to those of FIG. 4 are assigned the same reference numerals.

In FIG. 1, reference numeral 18 designates a fuel supply means connected to the DC power output of cell 1. The electrolyte composed of a solution of sodium hydroxide or such stored in said supply means 18 is electrolyzed, and the gases produced by this electrolysis are supplied to the hydrogen gas and oxygen gas feed lines 30a, 30b for cell 1 through piping 25a, 25b.

An example of fuel supply means 18 is described in detail with reference to FIG. 2. The drawing shows the state in a regular operation. Tank 19 is filled with a pressurized electrolyte, for example, a 15-20% sodium hydroxide solution. In the electrolyte are set cathode plate 20a and anode plate 20b both of which are connected to the DC power output ends. Each of said cathode plate 20a and anode plate 20b is encompassed with a gas reservoir tube 21a, 21b for storing the gas produced by the plate. Said gas reservoir tubes 21a, 21b are connected to hydrogen gas and oxygen gas feed lines 30a, 30b through piping 25a, 25b and valves such as solenoid valves 22a, 22b, respectively. Tank 19 is connected to electrolyte supply source 26 via valve such as solenoid valve 23. The electrolyte in tank 19 is pressurized by accumulator 24.

This fuel supply means 18 operates as described below.

When an electric current is applied from cell 1 to cathode and anode plates 20a, 20b in the state of FIG. 2, the following reaction occurs in the anode to produce hydrogen gas:

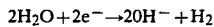

On the other hand, there takes place the following reaction in the anode to produce oxygen gas:

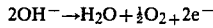

Thus, in the gross, the following reaction is accomplished:

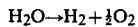

The produced hydrogen gas and oxygen gas are stored in gas reservoir tubes 21a, 21b, respectively. The electrolyte forced out with generation of said gases flows into accumulator 24, whereby the electrolyte in tank 19 is further pressurized.

As the electrolysis of the electrolyte advances, the amount of the produced gases stored in said respective gas reservoir tubes 21a, 21b increases steadily, and when the liquid level of the electrolyte descends to a point below the lower ends of cathode and anode plates 20a, 20b, the electric current is shut off and accordingly the reactions stop.

Through this process, hydrogen gas and oxygen gas are always stored in fuel supply means 18 during the regular mode of operation.

In case the power load connected to the fuel cell system rises up abruptly, a load rise signal is given to solenoid valve control unit 27 which thereupon operates to control solenoid valves 22a, 22b so that they open for a given period of time. Upon opening of solenoid valves 22a, 22b, both hydrogen gas and oxygen gas in gas reservoir tubes 21a, 21b, which are in a state of being pressurized by accumulator 24, are rapidly forced out and supplied to hydrogen and oxygen gas feed lines 30a, 30b connecting to cell 1.

After this hydrogen and oxygen supply operation has been conducted for a given period of time, solenoid valves 22a, 22b are closed by control unit 27 to stop fuel supply to cell 1.

FIG. 3 illustrates the pattern of power generation by the fuel cell system on fuel supply. It will be seen that in comparison with the prior art (see FIG. 5(b)), the power output increases by an amount corresponding to area B, and as a result, the time lag decreases greatly to T2 (T2 < T1) and the load responsiveness is markedly improved.

The electrolyte consumed by the electrolysis is supplied from the outside by opening solenoid valve 23.

As described above, in accordance with the present invention, the electrolyte is electrolyzed to produce hydrogen gas and oxygen gas by DC power generated by a fuel cell, and the produced gases are stored and supplied to the cell at the time of rapid rise of load, so that the responsiveness to the sharp rise of load in the fuel-cell power generator is improved.

In the described embodiment of the invention, the fuel supply is made by using the gases produced by electrolyzing the electrolyte by DC power generated by a fuel cell, but the same effect can be obtained by storing the already produced gases in cylinders or the like and supplying such gases to the cell on occurrence of a sharp rise of load.

Figure 6:
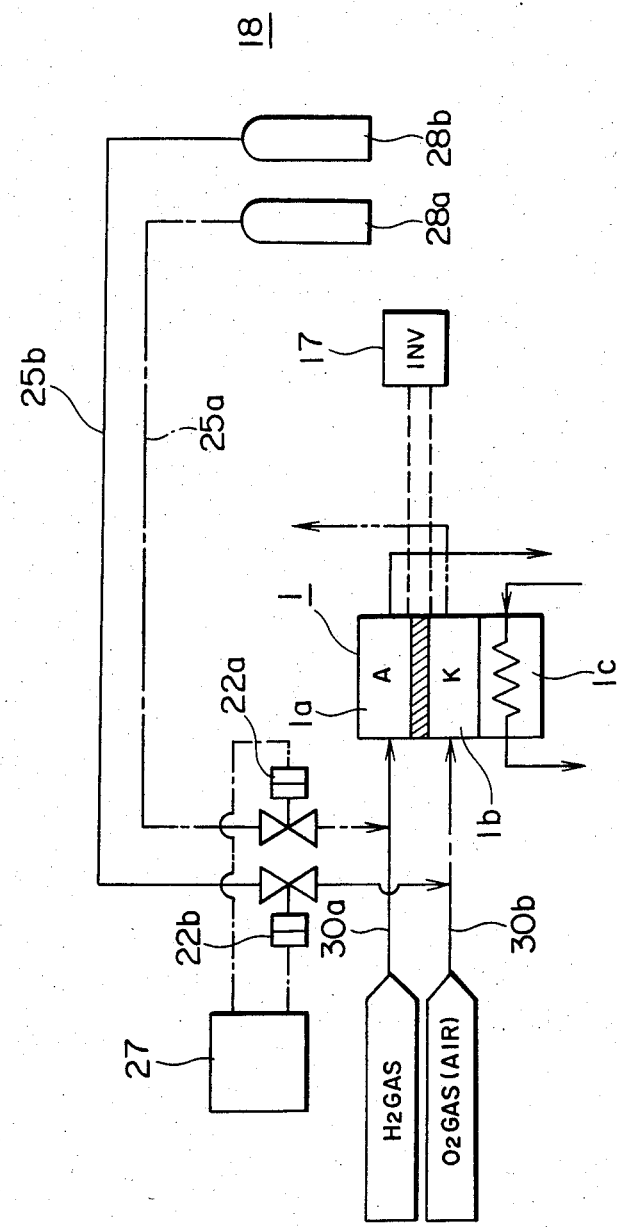
FIG. 6 is a system diagram illustrating in detail the fuel supply means adapted in the power generator of FIG. 1, which fuel supply means is different in mechanism from that shown in FIG. 2.

In the latter case, as illustrated in FIG. 6, hydrogen gas cylinders 28a and oxygen gas cylinders 28b are provided, and these cylinders are connected through pipes 25a, 25b to hydrogen and oxygen feed lines 30a, 30b, respectively, which lead to fuel cell 1, and solenoid valves 22a, 22b arranged to be opened and closed by control unit 27 are provided on said pipes 25a, 25b. Said cylinders 28a, 28b may be of a commercially available type. This arrangement makes it possible to provide a fuel-cell power generator which is simple in mechanism and improved in responsiveness to sharp rise of load.

What is claimed is:

1. A fuel-cell power generator comprising hydrogen and oxygen feed lines, a fuel cell which generates DC power as the cell receives hydrogen gas and oxygen gas from said feed lines, and fuel supply means which supplies hydrogen gas to said hydrogen feed line and oxygen gas to said oxygen feed line in response to a sharp rise of power load connected to said fuel cell; said fuel supply means including means for producing hydrogen gas and oxygen gas by electrolyzing an electrolyte by DC power generated by said fuel cell and for supplying the produced gases to said hydrogen and oxygen feed lines connected to said fuel cell; said means for producing hydrogen gas and oxygen gas comprising a tank containing pressurized electrolyte, hydrogen and oxygen electrodes disposed in said tank and connected to the DC power source of said fuel cell, cylindrical gas reservoirs for storing the gases produced from said oxygen electrode and said hydrogen electrode, respectively, and piping means for connecting said cylindrical gas reservoir to said hydrogen and oxygen feed lines via valves.

2. The fuel-cell power generator according to claim 1, wherein the valves provided on piping connecting said cylindrical gas reservoirs to said hydrogen and oxygen feed lnies leading to said fuel cell are solenoid valves, and a control unit is provided for controlling the opening and closing of said solenoid valves upon receiving a load rise signal at the time of a rapid change of power load connected to said fuel cell.

3. The fuel-cell power generator according to claim 1, wherein said tank containing the electrolyte is provided with an accumulator for pressurizing said electrolyte.

4. The fuel-cell power generator according to claim 1, wherein at the time of a sharp rise of power load, hydrogen gas and oxygen gas are supplied from said fuel supply means to said hydrogen and oxygen feed lines for a time in which the feed of said gases to said gas feed systems leading to said fuel cell reaches the required level.

5. The fuel-cell power generator according to claim 2, wherein the period in which the solenoid valves are opened by said control unit at the time of a sharp rise of power load is about 2–10 seconds.

6. The fuel-cell power generator according to claim 1, wherein said fuel supply means also comprises a hydrogen gas cylinder, an oxygen gas cylinder, piping connecting said gas cylinders to the hydrogen and oxygen feed lines leading to said fuel cell, and valves provided on said piping.

7. The fuel-cell power generator according to claim 6, wherein the valves provided on piping connecting said gas cylinders to said hydrogen and oxygen feed lines are solenoid valves, and a control unit is provided for controlling the opening and closing of said solenoid valves on receiving a load rise signal at the time of a sharp rise of power load connected to the fuel cell.

* * * * *